United States Patent [19]
Lewis et al.

[11] 3,938,153
[45] Feb. 10, 1976

[54] SIDELOBE CANCELLER SYSTEM

[75] Inventors: Bernard L. Lewis, Oxon Hill; Irwin D. Olin, Potomac, both of Md.

[73] Assignee: The United States of America as represented by the Secretary of the Navy, Washington, D.C.

[22] Filed: Aug. 16, 1974

[21] Appl. No.: 499,260

[52] U.S. Cl.............................. 343/100 LE; 325/371
[51] Int. Cl.² ......................................... G01S 3/06
[58] Field of Search............... 343/100 LE, 100 CL; 325/371

[56] References Cited
UNITED STATES PATENTS
3,202,990  8/1965  Howells ..................... 343/100 LE

*Primary Examiner*—T. H. Tubbesing
*Assistant Examiner*—Richard E. Berger
*Attorney, Agent, or Firm*—R. S. Sciascia; A. L. Branning; G. A. Montayne

[57] ABSTRACT

An improved side-lobe canceller system for reducing interference introduced into a signal receiving system from multiple interference sources. A first canceller loop associated with an auxiliary channel operates independently to decorrelate its auxiliary signal and the output sample of a main channel signal from its own subtractor. Each of a remaining plurality of canceller loops, also associated with an auxiliary channel and operating independently, are serially connected to successively operate on the output of a previous canceller loop. When all auxiliary canceller loops have operated, a second series of the same canceller loops arranged to follow the first series, provides an additional iteration to the canceller system. By utilizing a plurality of serially arranged iterations to operate on the signals received by the plurality of auxiliary channels, the interference in the main channel may be significantly reduced.

9 Claims, 3 Drawing Figures

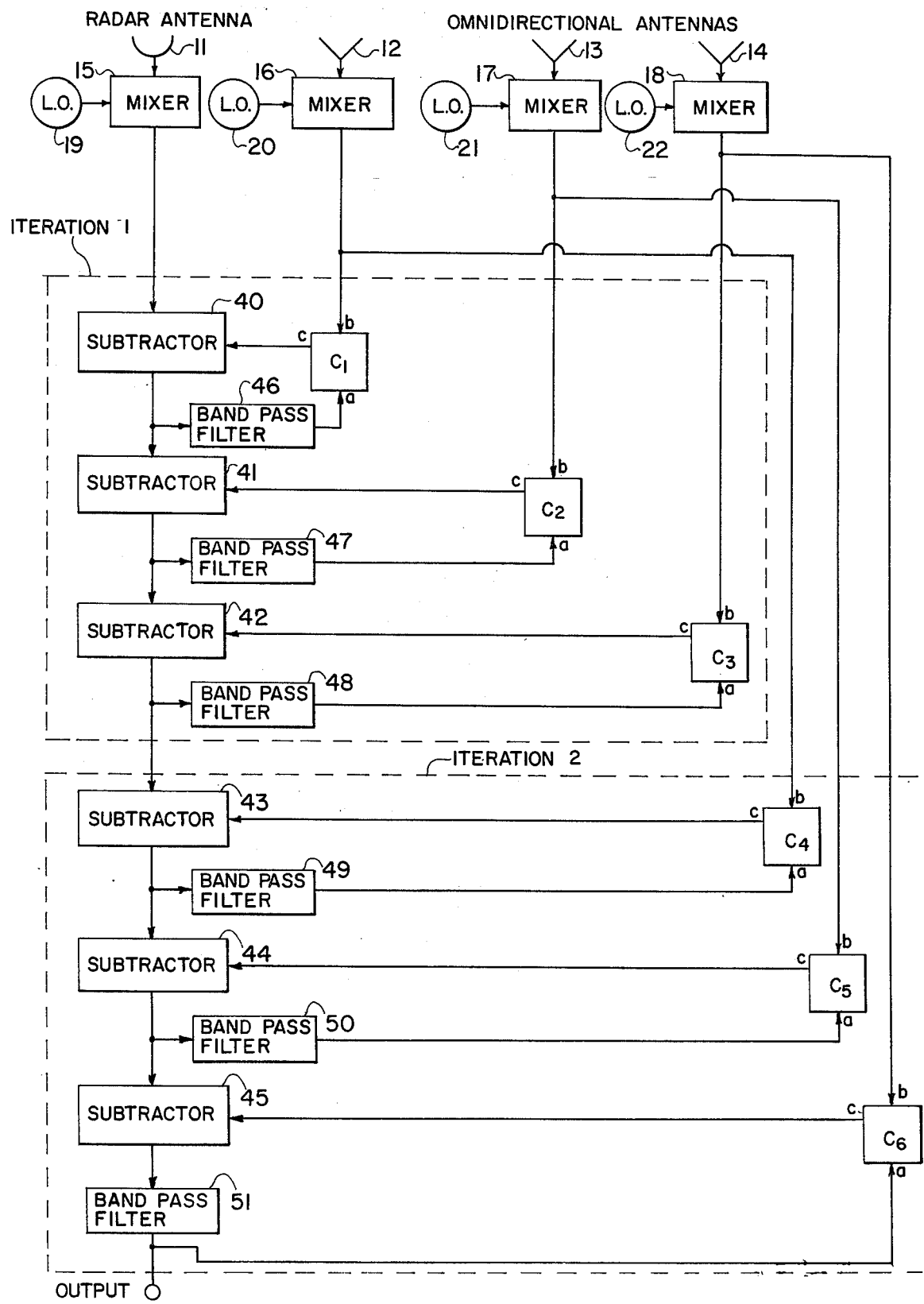

SIDELOBE CANCELLER SYSTEM

BACKGROUND OF THE INVENTION

The present invention relates to improvements in signal processing systems and more particularly to improved techniques for eliminating interference introduced into the side-lobes of an antenna from multiple interference sources.

Signal processing equipment in general is designed with a goal of receiving only particular information for evaluation. However, as is often the case, desired information is not isolated by itself but may be found in the presence of unwanted signals. Antenna systems in particular have characteristics that include a main lobe for receiving desired information and a plurality of side-lobes at various angles relative to the main lobe. Due to the nature of an antenna, information received in a side-lobe is indistinguishable from information received in the main lobe and thus renders the antenna highly susceptible to interference from unwanted signals or information. This problem is particularly acute in radar systems where the presence of side-lobes makes it possible for a single noise jammer to be effective against a radar from any angle of azimuth. The problem becomes even more acute when multiple interference or jamming sources are used against a radar and directed from a variety of directions simultaneously.

Side-lobe cancellation is a fundamental approach to eliminating interference in received signals and has been used relatively successfully to eliminate the interference introduced from a single jamming source. Generally, to provide successful cancellation, the side-lobe canceller uses a signal received by an auxiliary omnidirectional antenna to cancel the interference signal received in the side-lobe of the primary antenna. Such a system is taught by U.S. Pat. No. 3,202,990 to Paul W. Howells.

In the case of a plurality of interference or jamming sources, conventional side-lobe canceller systems have not been quite as successful in eliminating interference. As also shown by the patent to Howells, multiple auxiliary antennas distributed in space sample the electromagnetic interference in which the radar is attempting to operate and are combined with the interference in the main radar antenna in a manner designed to subtract the interfering signals. The system according to Howells, however, uses a parallel connection of canceller loops attempting to minimize the correlation between its auxiliary signal and the output of the main channel subtractor. Each canceller, however, can develop only one correlator output that must attenuate and phase shift all components of the auxiliary signal by the same amount. Due to the parallel connection, this can give rise to one canceller introducing signals that must be taken out by another when two or more uncorrelated interference signals are simultaneously received from different directions. This necessity for the cancellers to work against each other requires the canceller loops to have large dynamic ranges that introduce instabilities into the system and limit canceller effectiveness. In practice the instability has been reduced by limiting the gain in each loop, but the total effect is then to limit the amount of cancellation which in turn degrades the overall system performance.

Accordingly, the present invention has been developed to overcome the specific shortcomings of the above known and similar techniques and to provide a device for increasing the cancellation and stability of interference suppression systems.

SUMMARY OF THE INVENTION

It is therefore an object of the present invention to provide an interference suppression system that has all the advantages of similarly employed techniques and none of the disadvantages.

Another object of the invention is to provide cancellation of interfering signals from multiple jamming sources that eliminates canceller loop opposition.

A further object of this invention is to provide a side-lobe canceller system which eliminates feedback between cancellers, requires less dynamic range, and yet provides improved cancellation.

Still another object of the invention is to provide an interference suppression system formed from a series of independently operating canceller loops forming a plurality of iterations.

A still further object of the invention is to provide a side-lobe canceller that can use high loop gains and still maintain stable operation for effective cancellation.

In order to accomplish the above and other objects, the invention provides for a side-lobe canceller system having a main directional radar antenna input and a plurality of auxiliary omnidirectional antenna inputs for receiving interference from a plurality of noise or jamming sources. Each of the auxiliary antenna inputs is connected to supply a signal to a canceller loop including its own subtractor, and each of the loops is serially arranged to operate on the output of the previous subtractor. The output from the main antenna is fed to the first subtractor and is continually reduced by the operation of each subsequent canceller loop. After all canceller loops have operated on the main antenna sample, a second series of canceller loops, receiving signals from each of the auxiliary antennas, is arranged in the same order as the first series to provide a second iteration for cancelling interference in the main antenna. By providing a series of iterations having independently operating canceller loops, the dynamic range of each canceller loop can be reduced allowing loop gain to be increased and providing improved cancellation, while at the same time preventing loop opposition and instability.

Other objects, advantages, and novel features of the invention will become apparent from the following detailed description of the invention when considered with the accompanying drawings:

BRIEF DESCRIPTION OF THE DRAWINGS

FIG. 3 is a block diagram of the canceller system according to the present invention showing the particular connections necessary for multiple serial iterations.

DETAILED DESCRIPITON OF THE PREFERRED EMBODIMENT

Figures 1, 2:
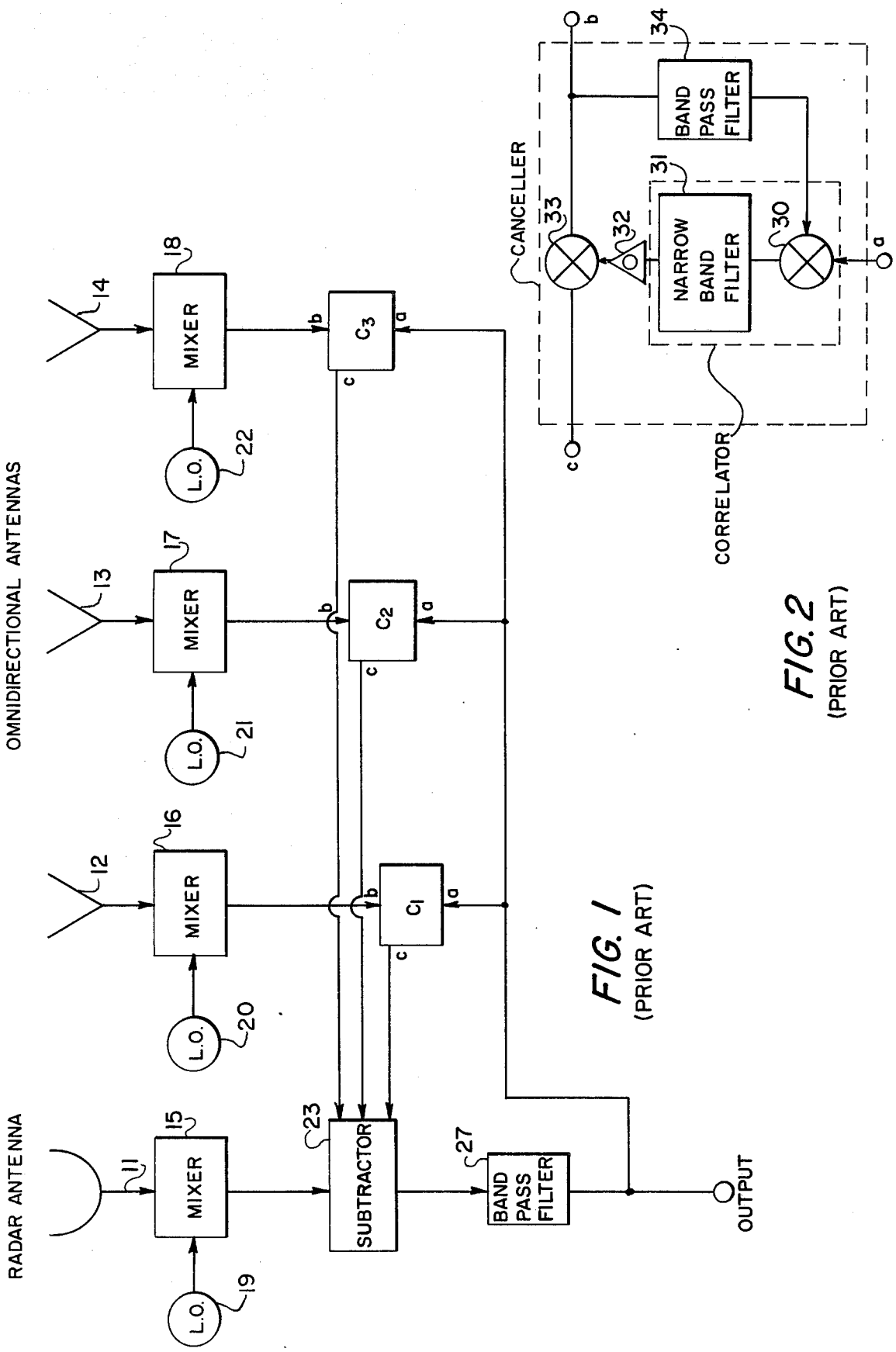
FIG. 1 is a block diagram of a prior art parallel canceller system showing the functional relationship between the different elements.
FIG. 2 is a schematic diagram of the electrical elements forming the cancellers in FIG. 1 and FIG. 3.

Referring to FIG. 1, a conventional multiloop interference suppression system is shown as a side-lobe canceller arrangement in a radar system. The theory behind the operation of this prior art system is generally taught by the patent to Howells U.S. Pat. No.

3,202,990, reference to which is hereby made, and will not be discussed in great detail. Generally, however, the system is comprised of a main receiving channel in the form of a directional radar antenna 11 and a plurality of auxiliary receiving channels designated by omnidirectional antennas 12–14. While only three auxiliary channels are shown, it is usual practice to employ as many auxiliary antennas as there are interference (jamming) sources. The output from the radar antenna 11 is mixed with the output from local oscillator 19 in a conventional mixer or multiplier circuit 15, down to an intermediate frequency (IF). In the same manner, the outputs from auxiliary antennas 12–14 are mixed with the outputs of their respective local oscillators 20–22 in conventional mixing circuits 16–18 respectively, down to an intermediate frequency offset from the frequency of the main channel by an amount at least equal to the main channel signal bandwidth. While the use of separate local oscillators has been described, it is obvious that other techniques of obtaining the desired IF frequency may be employed such as using a single local oscillator for all channels and then offsetting the frequency of the auxiliary channels. The output from mixer 15 in the main channel is then connected through a subtractor circuit 23 and a bandpass filter 27 to an input $a$ of cancellers $C_1$–$C_3$. Likewise, the outputs from mixers 16–18 in the auxiliary channels, are connected one to each canceller at the inputs $b$ of cancellers $C_1$–$C_3$ respectively. The output $c$ from each canceller is then fed back to the subtractor circuit 23 in the main transmission channel.

FIG. 2 shows the general construction of the canceller circuits $C_1$–$C_3$. Each canceller is identical and is formed from a conventional mixer or multiplier circuit 30 receiving the output from bandpass filter 27 through input $a$. Input $b$ is divided into two parts with one part passed through bandpass filter 34, having the same time delay as filter 27, and then to a second input to mixer 30. The second part of the auxiliary signal is fed to the input of multiplier or mixer 33. The output of mixer 30 is passed through a narrow band filter 31 and an amplifier 32 to a second input in the mixer 33. The outputs $c$ are then fed in parallel to the input to subtractor 23. While the narrow band filter 31 and amplifier 32 have been shown as separate elments the same could just as well be replaced by a narrow band amplifier for equivalent operation. The operation of the prior art system of FIG. 1. can now be described as follows:

When a plurality of jammers are present, the signal received at the main radar antenna includes a radar signal carrier modulated by the radar signal and having a specified amplitude and phase, and a plurality of jammer carriers having the same frequency but different amplitudes and phases, modulated by the jammer waveforms. The expressions of the jamming signals received in each of the auxiliary antennas is the same as the expressions for the jamming signals in the radar antenna except for a gain difference and a phase shift introduced by the difference in path length from each jammer to each omnidirectional antenna and from each jammer to the radar antenna. The magnitude of the phase shift depends on the position of each jammer and the distance between each auxiliary antenna and the radar antenna.

In order to cancel jamming, the waveform in the auxiliary channels must be properly corrected in phase and amplitude and then combined with the main channel waveform in a manner such that jamming signals cancel and the radar signal does not. To do this, the omnidirectional antenna jamming signals are mixed down to an intermediate frequency in mixers 16–18 respectively and offset in frequency from the intermedeiate frequency of the radar jamming signal present at the output of mixer 15 as was previously described. Bandpass filters 27 and 34 pass a carrier signal centered at the intermediate frequencies and modulated by the jammer waveforms. Each of the auxiliary signals are then mixed in a mixer 30, of each of the cancellers $C_1$–$C_3$, with the radar antenna output from bandpass filter 27. Mixer 30 and narrow band filter 31 generally form a correlator which produces a signal at a frequency difference equal to the difference between the two intermediate frequency inputs to each mixer 30. The amplitude of the signal is proportional to average jammer power in the main channel while the phase is equal to the phase of the jamming signal received at the respective auxiliary antennas with respect to its phase in the radar antennas. The output signal from the amplifiers 32 is a weighting signal that is then used to cancel the phase difference between the main and auxiliary jamming signal in mixer 33. The resultant output is a signal at the radar intermediate frequency that is controlled in amplitude and phase in such manner as to reduce the jamming signal in the main IF channel. Each canceller in the above case attempts to minimize the correlation between the auxiliary signal and the output of the subtractor. However, in doing so, each canceller can only develop one correlator output weight and must attenuate and phase shift all components of its signal by the same amount. Since the cancellers are added in parallel in subtractor circiut 23, there exists the condition of one canceller introducing signals that another canceller must take out when two or more uncorrelated jamming signals are received from different directions simultaneously. That this occurs can be shown by a vector analysis of the interaction between each of the loops for a given set of jammer configurations. For purposes of this invention, it is sufficient to note that such loop opposition requires large dynamic range for cancellation where high loop gain causes instabilities in the system resulting in ineffective cancellation and limited system performance. As a solution to the problem of instability, the gain of each canceller loop can be limited, but the same results in a limitation on the total cancellation able to be obtained.

Turning now to FIG. 3, a system according to the present invention is shown which substantially eliminates the feedback between cancellers which causes instability and requires large dynamic ranges in cancellers. Like numerals have been used to designate like elements throughout. The system is generally composed of radar antenna 11 forming the main channel for receiving the desired signal as well as interference signals, and auxiliary antennas 12–14 forming the auxiliary channels for receiving primarily interference signals. As is known in the art, the main radar antenna will recieve desired radar returns for indentifying a target as well as interference signals, while each of the auxiliary antennas will receive interference signals for developing a cancelling signal in the canceller loop. While some scattered radar returns may be received by the auxiliary antennas, the primary purpose of the auxiliary antennas is to provide samples of the interference environment to the canceller loops as has been previously described. Each channel output is fed to its respective mixers 15–18 where it is combined with outputs from local oscillators 19–22 respectively as has been previously described with reference to FIG. 1. In the present invention, contrary to the prior art technique, the cancellers are arranged in series such that each one operates independently of the other. As shown in the drawing, the output from mixer 15 is coupled to a subtractor 40. The output from 40 is then coupled to input $a$ of canceller $C_1$ through a bandpass filter 46 along with the output from mixer 16 at $b$. The canceller output $c$ from $C_1$ is then coupled back to subtractor 40 to complete the first canceller loop which operates as has been described with reference to FIG. 1. The output from subtractor 40 is then coupled to subtractor 41, whose output is coupled to input $a$ of canceller $C_2$ through filter 47 along with the output from mixer 17 and then back to subtractor 41 to close the loop. The effect of canceller loop $C_2$ is to reduce the interference in the residue from canceller loop $C_1$. In a like manner, the output from subtractor 41 is coupled to subtractor 42, through filter 48 and canceller $C_3$, and back to the same subtractor 42.

As can be seen from the above description, each of the auxiliary signals is fed to its own independent closed canceller loop arranged to serially follow the previous loop, until all the auxiliary antenna signals have been utilized. At this point, the output from the first auxiliary channel mixer 16 is fed to a second canceller loop $C_4$ whose output feeds through subtractor 43 receiving the residue input from subtractor 42. As in the previous cases, this subtractor output is fed back to its own canceller, in this case $C_4$, and also to the next subtractor in a serial arrangement. The outputs from each of the other auxiliary antennas are again used to feed cancellers $C_5$ and $C_6$ connected in the same serial manner as all previous canceller loops until all auxiliary channels have been used.

In the operation of the circuit of FIG. 3, each canceller obtains its sample of the radar jamming signal from its own subtractor and operates on the signal with the auxiliary channel signal. For example, $C_1$ operates on the main channel signal using signals from auxiliary antenna 12 by attempting to decorrelate the auxiliary signal from 12 and the output from subtractor 40. $C_2$ then operates on the residue of $C_1$, out of subtractor 40, using the signals from auxiliary antenna 13. This process is continued until all auxiliary antennas have been used once. The entire process is then repeated using all the same auxiliary signals in the same order through cancellers $C_4$–$C_6$ as illustrated, with the final output taken through bandpass filter 51. Each process repetition or group of cancellers is designated an iteration as generally shown in FIG. 3, and the obtainable cancellation ratio, which is defined as the ratio of the input to output jammer power in the main channel, is proportional to the number of iterations employed. While only two iterations are shown in the drawings, it is contemplated that as many could be serially connected as required for a particular application.

The operation of the system described in FIG. 3 is similar to the recirculation of the data using conventional parallel loops. However, the system according to the present invention produces a process that is inherently more stable, less lossy in recirculation, and has a settling time as short or shorter than conventional canceller systems. The increased stability is derived from the formation of independent canceller loops so that each canceller operates independently of all others requiring no feedback between cancellers. Less lossy recirculation is obtained since successive loops operate directly on the residue of previous loops rather than through successive recirculations through narrow band finite gain correlator loops as in conventional systems. The fast system response is provided since all iteration are substantially simultaneous, i.e. the effect of the first iteration is felt immediately by the last rather than being delayed by successive recirculations through the narrow band correlator loops.

As can be seen from the above description, the present invention provides a simple and effective technique for providing improved cancellation in a signal receiving system exposed to multiple interference sources. Using a main channel signal and a plurality of auxiliary channel signals to sample the jamming environment, a series of independent canceller loops, arranged to form a series of canceller groups or iterations, operates to reduce the interference in the receiving system. The inherent stability of this iterative system, contrary to prior techniques, allows a reduction in the dynamic range of each canceller loop resulting in less complex implementation. In addition, the serial configuration effectively cascades loop gains and eliminates feedback between cancellers causing system instability, which in turn allows high loop gain to be used without introducing the danger of oscillation. While the multiloop process described above does increase the probability of loop failure because of the increase in the number of loops, the same increase in number reduces the criticality of failure of any of the loops. Also since the canceller loops are constructed from relatively simple elements, the structure of the present system lends itself well to construction using integrated circuit techniques that substantially reduce the cost for a greater number of loops. Additionally, since the amount of cancellation depends on the number of iterations employed, an effective trade-off between cancellation and cost can be made by simply controlling the number of canceller groups in any particular application.

While the invention has been described with reference to a particular receiving system, in this case a radar system, it is noted that the same techniques are applicable to a variety of other signal processing systems such as sonar, etc. In addition, the use of only three auxiliary channels was only for purposes of a simplified description, it being obvious from the inventive teachings that more could be utilized depending on the number of jammers. Further, although the invention has been described with particular reference to an IF receiving system and specific canceller construction, the inventive teachings are equally applicable to any signal cancelling system using adaptive canceller loops of any appropriate construction.

Obviously many other modifications and variations of the present invention are possible in light of the above teachings. It is therefore to be understood that within the scope of the appended claims the invention may be precticed otherwise than as specifically described.

What is claimed and desired to be secured by Letters Patent of the United States is:

1. An interference cancellation system comprising:
   a main channel means for receiving desired signals and interference signals and forming a main channel signal;
   a plurality of auxiliary channel means for receiving primarily interference signals and forming auxiliary channel signals.

first means coupled to said main channel means and said auxiliary channel means for comparing interference signals in the main channel means and each of the auxiliary channel means and providing cancelling signals which reduce interference in the main channel signal; and at least one iterative means coupled to said first means and said auxiliary channel means for comparing the main channel signal from said first means with each of the signals of the auxiliary channel means and providing cancelling signals which further reduce interference in the main channel signal.

2. The system claim 1 wherein said first means comprises a plurality of canceller loops, with one loop coupled to each auxiliary channel means in such manner that each loop has an input from the main channel signal and its respective auxiliary channel signal and a reduced interference main signal output and wherein said at least one iterative means comprises a plurality of canceller loops, with one loop coupled to each auxiliary channel means in such manner that each loop has an input from the main channel signal and its respective auxiliary channel signal and a reduced interference main signal output.

3. The system of claim 2 wherein each of said canceller loop comprise; canceller means for comparing the main channel interference signal and its respective auxiliary channel signal and providing a cancelling signal therefrom and a subtractor connected to subtract said cancelling signal from said main channel signal to form said reduced interference main signal output.

4. The system of claim 3 wherein each canceller means of each canceller loop is connected to receive the output from its own subtractor as the main channel interference signal to thereby form a plurality of independent canceller loops.

5. The system of claim 4 wherein a subtractor of one of the canceller loops of said first means is connected to receive the main channel signal from said main channel means and each of the remaining subtractors are serially connected such that the output from a previous subtractor forms the main signal input to the next succeeding subtractor until all subtractors of said first means have been used, and wherein a subtractor of one of the canceller loops of said at least one interative means is connected to receive the main channel signal from the last subtractor output of the first means and each of the remaining subtractors are serially connected such that the output from a previous subtractor forms the main signal input to the next succeeding subtractor until all subtractors of said at least one iterative means have been used.

6. The system of claim 5 wherein the canceller loops of said at least one iterative means are arranged to utilize the auxiliary channel signals in the same serial order as the canceller loops of said first means.

7. The system of claim 6 wherein said at least one iterative means comprises a plurality of iterative means serially connected such that the main signal output of the previous iterative means is connected as input to the next succeeding iterative means to successively reduce interference in the main signal output.

8. The system of claim 7 wherein said main channel means comprises a directional antenna for providing the main channel signal and wherein each of said auxiliary channel means comprises an auxiliary antenna for providing the auxiliary channel signals.

9. The system of claim 8 wherein each of said auxiliary antennas is an omnidirectional antenna.

* * * * *